(No Model.) 2 Sheets—Sheet 1.

W. WEBBER.
APPARATUS FOR DRILLING WELLS.

No. 431,131. Patented July 1, 1890.

WITNESSES.
INVENTOR.

(No Model.) 2 Sheets—Sheet 2.

W. WEBBER.
APPARATUS FOR DRILLING WELLS.

No. 431,131. Patented July 1, 1890.

UNITED STATES PATENT OFFICE.

WESLEY WEBBER, OF PITTSBURG, PENNSYLVANIA.

APPARATUS FOR DRILLING WELLS.

SPECIFICATION forming part of Letters Patent No. 431,131, dated July 1, 1890.

Application filed September 11, 1889. Serial No. 323,587. (No model.)

*To all whom it may concern:*

Be it known that I, WESLEY WEBBER, of Pittsburg, in the county of Allegheny and State of Pennsylvania, have invented a new and useful Improvement in Apparatus for Drilling and Operating Wells, of which the following is a full, clear, and exact description, reference being had to the accompanying drawings, forming part of this specification, in which—

Figure 2:
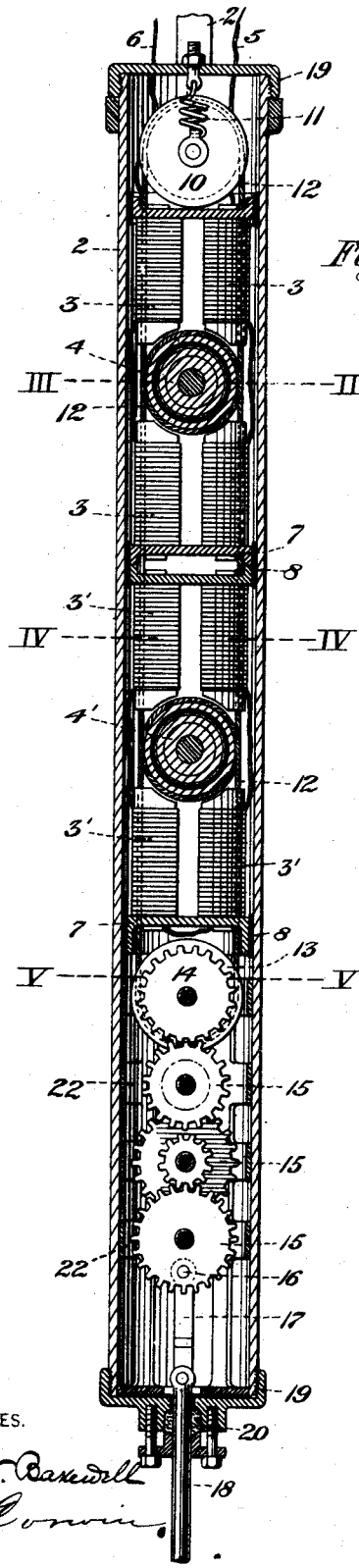
Figure 1:
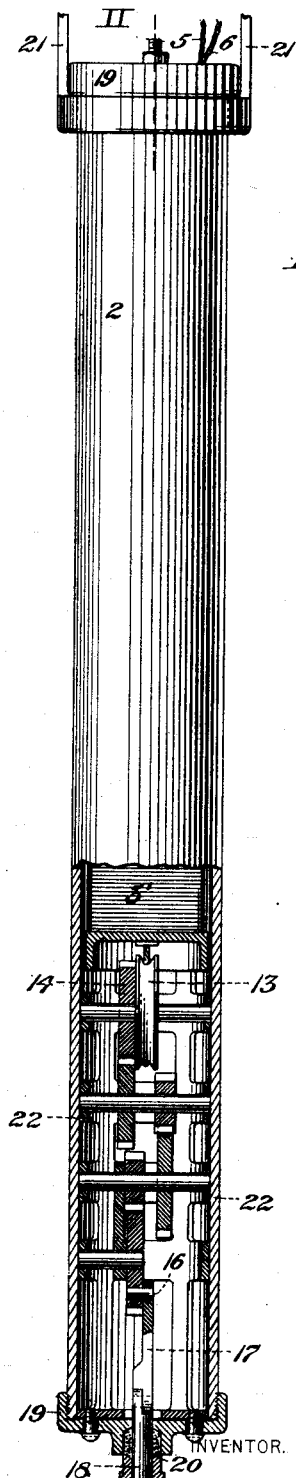
Figure 3:
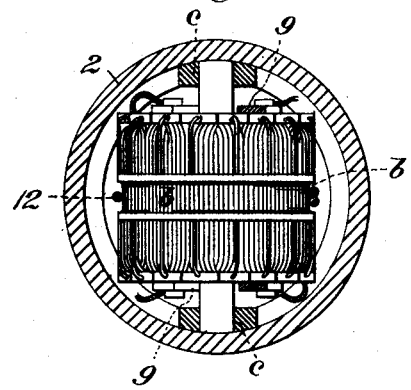
Figure 4:
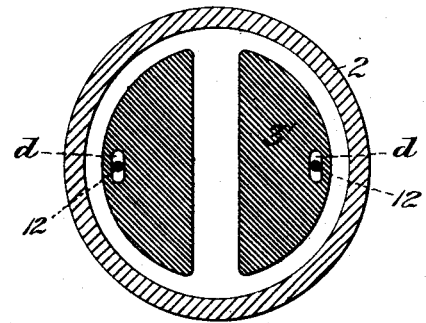
Figure 5:
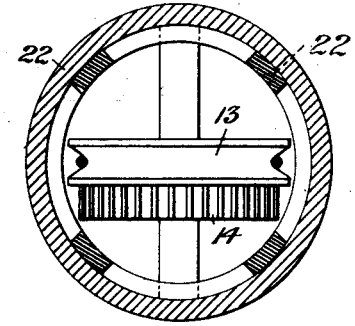

Figure 1 is a side elevation, partly in section, of my improved apparatus. Fig. 2 is a vertical longitudinal section on the line II II of Fig. 1. Fig. 3 is a horizontal cross-section on the line III III of Fig. 2. Fig. 4 is a horizontal cross-section on the line IV IV of Fig. 2. Fig. 5 is a horizontal cross-section on the line V V of Fig. 2.

Like symbols of reference indicate like parts in each.

The inconvenience and expense attendant upon the use of the tools heretofore commonly employed for drilling and pumping deep wells—such as oil and gas wells—have led to the present invention. The usual drilling-tools are hard to manage on account of their great weight and their cumbrous construction, and when they become jammed in the well—an accident of frequent occurrence in practice—they are very hard to disengage and remove, and often, owing to circumstances rendering it practically impossible to remove them, they must be abandoned and all the labor previously expended in drilling the well lost. To prevent this, I have devised an apparatus in which, as distinguished from the use of a motor for the tools situate at the surface of the earth, there is an apparatus comprising a series of motors and a tool let into the bottom of the well, where the work is to be performed, the motive power being an electric current, which is transmitted by means of conducting-wires from a generator of electricity situate at the surface.

My invention consists in a specific arrangement of such electric motors by which I am enabled to use them to the best advantage, and to obtain great power from apparatus of small diameter.

In the drawings, 2 represents a case, preferably of cylindrical form and of proper size to admit its insertion into the well to be drilled or operated. Within this case are electric motors, preferably two or more, of which 3 3 are the magnets and 4 the armature of one motor, and 3' 3' the magnets and 4' the armature of another motor. For the purpose of having the motors of as small size as possible, I prefer to arrange the magnets longitudinally within the case.

5 6 are the electrical conductors, which are connected with the magnets in series, and which are of sufficient length to extend from the top to the bottom of the well to be drilled or operated. In the use of the apparatus these conductors are connected to a suitable generator of electricity situate at the surface of the ground. The magnets are held in position in the case 2 by suitable supporting-plates 7, which are insulated from the case by insulating material 8. The construction of the armatures and the arrangement of the usual brushes 9 are clearly shown in Fig. 3. Each armature is journaled in the case in suitable bearings $c$, and is provided with a portion $b$ grooved to form a pulley-wheel, or, if desired, the pulley-wheel may be attached to the armature, though the latter construction is not so convenient. At one end of the case is a belt or cord pulley 10, the bearings of which are supported by springs 11, to take up the slack of the belt or cord 12, which passes around the pulley-wheel, and is wrapped around the grooved portion of each of the armatures and around a pulley-wheel 13 near the opposite end of the case, so that the revolution of the armatures will by motion of the belt produce a rotation of the pulley-wheels 10 and 13. As it is deirable to economize space as much as possible, I pass the belt through holes $d$, made for that purpose in the several magnets. On the shaft of the pulley 13 is a toothed pinion 14, which is in gear with a series of other pinions 15, the last of the series being provided with crank 16 and pitman 17, adapted to impart a reciprocating motion to a projecting rod 18. The first gear-wheel 14 of the series has a very rapid motion, and as it is generally desirable to convert such motion into one having greater force and less speed I construct the several gear-wheels 15 to effect this end, as clearly shown in the drawings. The several gear-wheels are suitably journaled in a removable frame 22.

For the purpose of excluding moisture from the apparatus, both ends of the case are closed by threaded caps 19, and the rod 18 is arranged to pass through a stuffing-box 20, which is applied to the cap at that end of the case 2. The case is suspended by any suitable means from rods or straps 21 at the upper end.

When the apparatus is to be used for drilling, a suitable drilling-tool is attached to the end of the reciprocating rod 18, so that when the case is lowered to the bottom of the well the reciprocations of this tool shall cut away the earth. During the drilling operation the case 2 may be turned from time to time to give the proper action to the drilling tool, or the same effect may be produced by providing the drilling-tool with suitable appliances known to the art, by which reciprocation produces also rotation on its longitudinal axis. In drilling, the apparatus should be drawn from the well from time to time, for the purpose of permitting the insertion of a sand-bail to remove the débris or cuttings.

When the apparatus is used for the purpose of pumping wells, the pump-rod or plunger is attached to the reciprocating rod 18. In such case it is desirable to place the apparatus in the well and into the fluid, with the rod 18 projecting upwardly.

The advantages of my invention have already been indicated and will be appreciated by those familiar with the disadvantages attending the use of the drilling and pumping appliances heretofore in use. The apparatus is simple in construction, not apt to get out of order, and is easy to remove from and to place in the well, and affords a great saving of mechanical power and in the time necessary to be spent in their use as compared with the use of the heavy and cumbrous drilling-tools heretofore known in the art.

I am aware that the use of an electric motor adapted to be let into a well for boring the same has been described, and this I do not claim.

I claim—

1. An apparatus for operating or drilling deep wells, which consists in an elongated case adapted to be let into the well and a series of electric motors arranged therein in tandem and mechanically connected, substantially as and for the purposes described.

2. An apparatus for operating or drilling deep wells, which consists in an elongated case adapted to be let into the well and a series of electric motors comprising electro-magnets and their armatures, arranged in the said case in tandem, and a belt or cord passing through holes in the magnets and mechanically connecting the armatures, substantially as and for the purposes described.

3. In apparatus for operating or drilling deep wells, the combination, with an inclosing-case, of electric motors comprising electro-magnets and their armatures, a belt or cord connecting the armatures, a pulley 10, having spring-bearings, a pulley 13, and gearing connected with the latter pulley, substantially as and for the purposes described.

In testimony whereof I have hereunto set my hand this 9th day of September, A. D. 1889.

WESLEY WEBBER.

Witnesses:
THOMAS W. BAKEWELL,
W. B. CORWIN.